Figure 1:
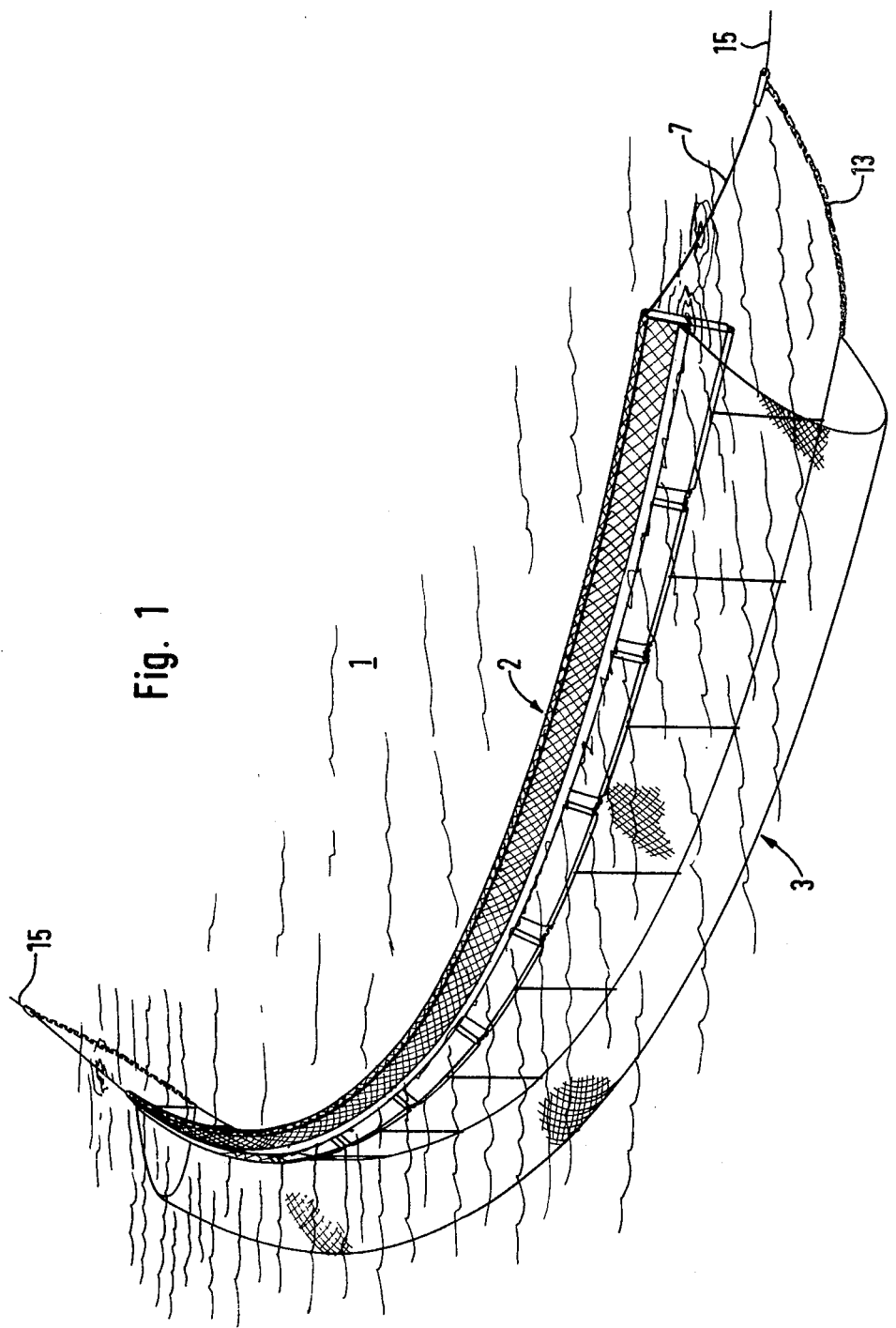

United States Patent [19]

Nyfeldt et al.

[11] 4,272,214

[45] Jun. 9, 1981

[54] FLOATING FENCE FOR THE COLLECTION OF LIQUID IMPURITIES AS FOR EXAMPLE OIL ON A WATER SURFACE

[76] Inventors: Harry Nyfeldt, Box 20, S 430 82 Donsö; Klas Y. T. Bernhardsson, Hus 81, S 430 92 Fotö, both of Sweden

[21] Appl. No.: 90,897

[22] Filed: Nov. 5, 1979

[30] Foreign Application Priority Data

Nov. 6, 1978 [SE] Sweden ............................ 7811433

[51] Int. Cl.³ ............................................. E02B 15/04
[52] U.S. Cl. ...................................................... 405/72
[58] Field of Search ................... 210/242, DIG. 25; 405/60, 63–72

[56] References Cited

U.S. PATENT DOCUMENTS

| | | | |
|---|---|---|---|
| 3,499,291 | 3/1970 | Mikkelsen | 405/66 |
| 3,612,280 | 10/1971 | Fitzgerald | 210/DIG. 25 |
| 3,667,235 | 6/1972 | Preus | 405/63 |
| 3,686,870 | 8/1972 | Blombey | 405/72 |
| 3,688,506 | 9/1972 | Marcocchio | 405/63 |
| 3,739,584 | 6/1973 | Belm | 405/67 |
| 3,807,177 | 4/1974 | Obez | 405/70 |
| 3,903,701 | 9/1975 | Gauch | 405/66 |
| 3,922,862 | 12/1975 | Vidilles | 405/70 |
| 3,973,406 | 8/1976 | Casey | 405/66 |
| 4,033,137 | 7/1977 | Geist | 405/71 |
| 4,096,700 | 6/1978 | Maurameare | 405/63 |
| 4,124,981 | 11/1978 | Preus | 405/66 |
| 4,190,381 | 2/1980 | Knaus et al. | 405/63 |

*Primary Examiner*—Theodore A. Granger

[57] ABSTRACT

It is an object of the invention to provide a floating fence, which offers as feeble flow resistance as possible and by means of which the impurities, which shall be collected, are in an efficient manner guided into the same with the smallest possible spillage. The floating fence designed according to the invention comprises an impermeable wall intersecting the water surface and a net section, the upper longitudinal portion of which is on the lee side attached to the impermeable wall near to the water surface, its other longitudinal edge portion being carried at a level below and at a distance from the lower longitudinal edge portion of the impermeable wall. The impermeable wall is carried by float bodies and is at its bottom edge portion of the net section and the upper portion of the impermeable wall in the longitudinal direction of the fence traversed by towing or anchoring cables.

8 Claims, 4 Drawing Figures

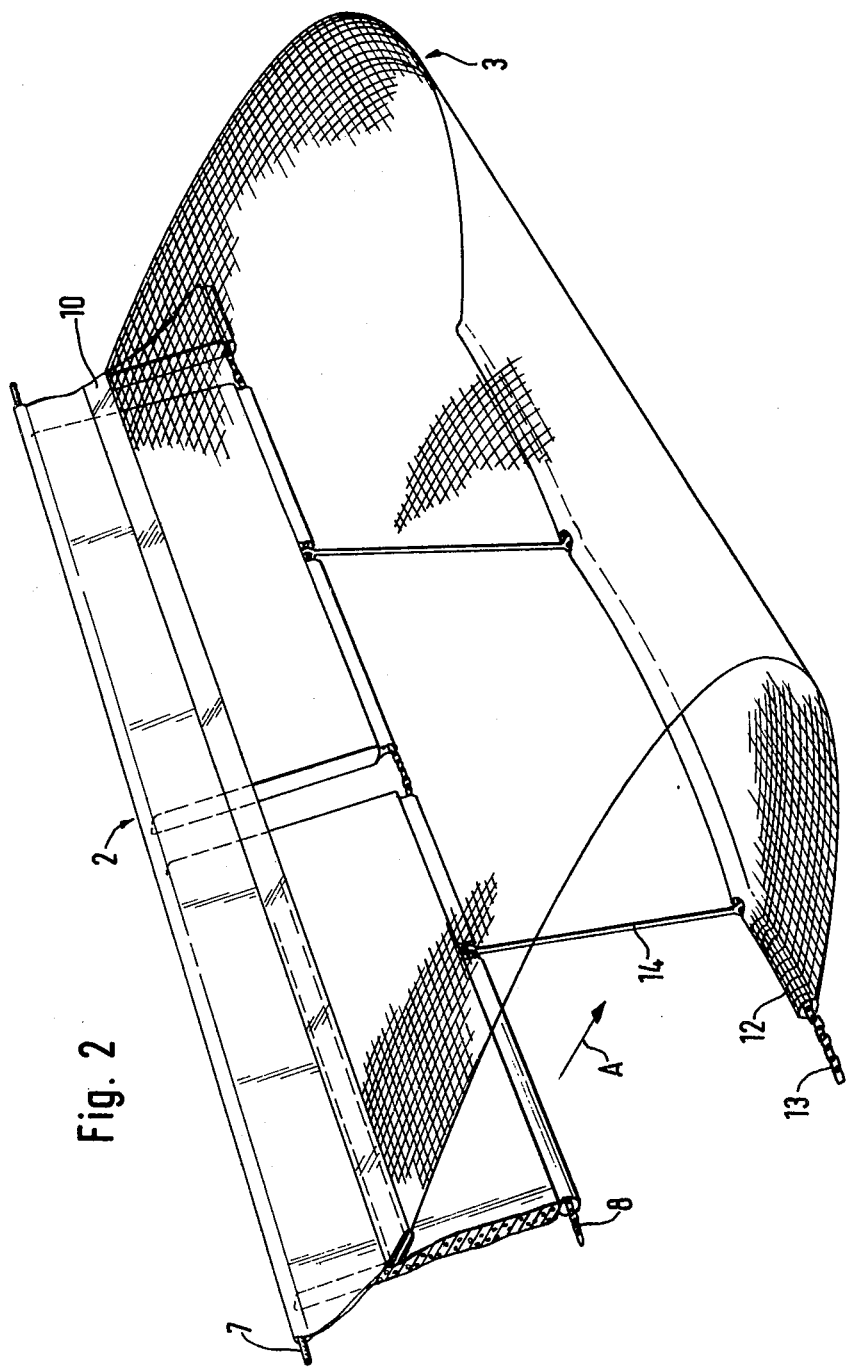

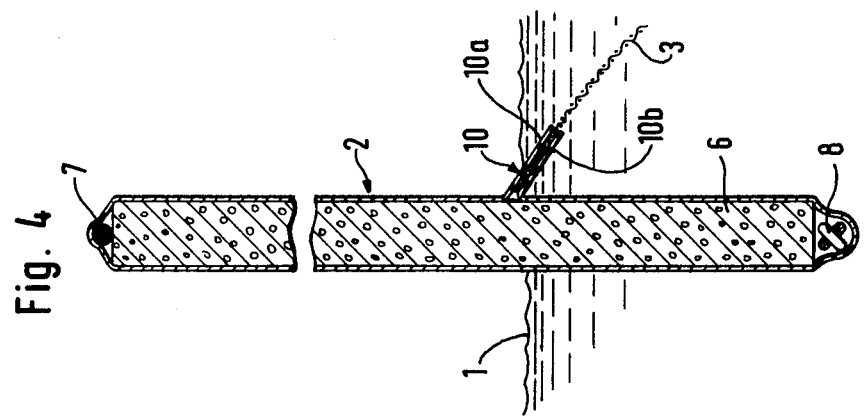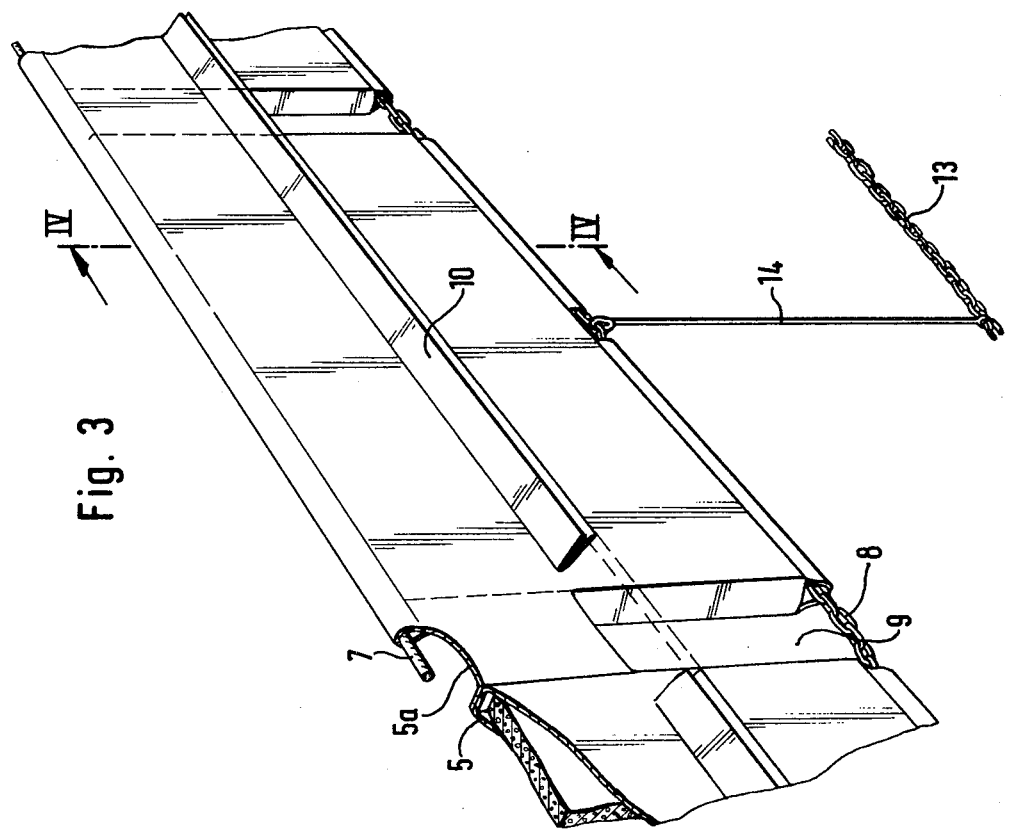

FLOATING FENCE FOR THE COLLECTION OF LIQUID IMPURITIES AS FOR EXAMPLE OIL ON A WATER SURFACE

The present invention relates to a floating fence for the collection of liquid impurities as for example oil on a water surface.

It is a principal object of the invention to provide a floating fence of the kind mentioned, which exhibits a good adaptiveness in following the movements created by successive ridges and depressions of the waves in the liquid medium, where the fence shall be used, exhibits a good collection capacity and produces the lowest possible stresses on the parts, of which it is assembled, as well as on tugging or anchoring means. It is moreover an object of the invention to provide a floating fence with as good guiding properties as possible for the feeding-in into the same of the impurities intended for collection as well as efficient means for impeding said impurities once trapped to again escape above or below the fence.

Said objects are reached by a floating fence designed according to the invention, which is substantially characterized by comprisng a wall, which intersects the surface of the liquid and is carried by float bodies, its portion above the surface of the liquid being impermeable, and to the portion of the wall positioned close to the surface of the liquid one longitudinal edge of a part comprising a net section is attached, of which net section the other longitudinal edge is provided with a ballast in such a way that an inlet opening is formed between the lower edge portion of said wall and the lower longitudinal edge portion of said net section leading to a bulge formed by the net on the lee side of said wall on account of the existing pressure of the liquid, when the fence is in use.

In the following an embodiment of the invention will be described, reference being made to the accompanying drawings, in which FIG. 1 is a perspective view of a floating fence designed according to the invention and placed in water, FIG. 2 is a perspective view on an enlarged scale showing a section of the same floating fence, FIG. 3 is a view of a corresponding section of the floating fence taken from the opposite side of the one shown in FIG. 2, and FIG. 4 is a cross-sectional view through the upper portion of the fence along the line IV—IV in FIG. 3.

The floating fence illustrated in the drawing in its upper portion comprises an upright impermeable wall intersecting the water surface 1, said wall in its entirety being indicated with 2. The wall is made of an envelope 5 of a dense and comparatively resistant material such as for example reinforced plastics. This envelope is formed from an initially plane web, which is double folded round a number of interspaced plane rectangular float bodies 6. The envelope in its upper portion encloses an anchoring or towing cable 7 and in its lower portion encloses a second cable 8, which in the illustrated embodiment comprises a chain and, thus, forms a ballast in the bottom portion of the fence. It is of course also possible within the scope of the invention to arrange another type of ballast. In such a case the cable can be of lighter material. It is of course also possible to combine the chain with additional ballast material. In the illustrated embodiment a double flap is provided on the lee side of the wall, the upper portion of which flap is indicated with 10a in FIG. 4, its lower portion being indicated with 10b. The upper edge portion of the net section 3 is secured between the two parts of this double flap, the bottom edge portion of said net section is a hem 12 carrying a chain 13, which in the illustrated embodiment also serves as a ballast. In the interspace between the float bodies the two layers of web forming part of the envelope are folded together in such a manner that the wall is hinged in these places. Below the surface of the liquid the wall exhibits passages 9 in the interspaces between the float bodies. From a point on each chain 8 located approximately on the middle part of the float bodies 6 a suspension cable 14 extends to the chain 13. The invention is of course not limited to the condition that the suspension cable is attached just at the midpoint of the float bodies even if this location has proved to be advantageous. It is of course also possible within the scope of the invention to arrange the suspension cables in the interspace between the float bodies. The invention is not either limited to the suspension cables being arranged in connection with each float body. It is also possible to arrange the suspension cables in another distribution than the one shown in the drawing. The suspension cables can also be arranged with varying interspace. The double helm 10 can suitably be formed by each one of the two longitudinal edge portions of the material, of which the envelope 5 is made. This material then can be folded round the float bodies and be joined together by the two flaps 10a and 10b. It is of course also within the scope of the invention to make the joint in question in a different way and also to hold the upper longitudinal edge of the net in place by other means. The fundamental idea of the invention is not either changed, if the flap 10 is a single flap. The portions of the upper cable 7 and the lower chain 8 positioned outside of the extreme ends of the floating fence are tied up with a common tow or anchoring cable 15. The two common cables 15 can by way of example each one be connected with its tug boat for the movement of the fence over the surface extension, where collection shall take place. When the fence is placed in water with a strong current, both the cables 15 can instead be connected with fixed anchoring means.

When the floating fence is used, it is laid out in the water in such a manner that the water will flow in the direction of the arrow A in FIG. 2. Then the net section 3 will form a bulge on the lee side of the wall 2. The wall 2 will occupy a somewhat oblique position relative to the direction of flow A of the water, as is shown in FIG. 2, i.e. its lower edge portion will be somewhat displaced towards the lee side of the fence, which means that the impurities to be collected can in an efficient manner be introduced into the bulge formed by the net section 3 without the impurities passing over the upper edge of the wall 2. A through-flow opening is formed between the lower border of the wall 2 and the lower border of the net extending along the whole length of the fence. Such impurities, which float close to the surface of the liquid and by way of example can comprise heavier oil lumps easily pass through the wall 2 through the openings 9 arranged between the float bodies. It is also within the scope of the invention to connect the chain extending along the lower edge of the wall or the cable 8 with the two cables 15. Such a design would permit increased possibilities of determining the angle of inclination of the wall relative to the water surface.

The invention is not limited to the embodiment described above and illustrated in the drawings, but can be varied as to its details within the scope of the following claims without therefore departing from the fundamental idea of the invention.

We claim:

1. Floating fence for the collection of impurities such as oil floating on the surface of a liquid, characterized by comprising a wall (2) intersecting the surface (1) of the liquid and being impermeable in the portion thereof above the surface of the liquid, float bodies (6) carrying said wall, a net (3) having one longitudinal edge attached to a portion of said wall positioned close to the surface of the liquid and another lower longitudinal edge portion provided with a ballast (13) in such a manner that an inlet opening is formed between the lower edge portion of said wall and the lower longitudinal edge portion of said net which results in a bulge being formed by the net behind the wall due to the existing pressure of the liquid when the fence is in use, a towing or anchoring cable (7;13) extending through the upper edge portion of the wall and the lower edge portion of the net, and interspaced suspension cables (14) connecting the lower edge portion of the wall and the lower edge portion of the net.

2. Floating fence according to claim 1, characterized by the wall below the water surface having openings (9) interspaced along the longitudinal extension of the fence and permitting a through-flow through the same.

3. Floating fence according to claim 1 or 2, characterized by the wall in its lower portion being provided with a cable (8) extending along the fence, which cable can also serve the purpose of ballast.

4. Floating fence according to claim 1 or 2, characterized by the upper edge portion of the net (3) being held by at least one flap of attachment (10) formed of the material of the wall.

5. Floating fence according to claim 2, characterized by the suspension cables (14) at their top being attached to the wall (2) in the portions of the same located between its openings (9).

6. Floating fence according to claim 1, characterized by said cable (13) extending through the lower edge portion of the net comprising chain material, which also can serve the purpose of ballast.

7. Floating fence according to claim 1 or 2, characterized by the wall comprising a double layer of plastic material or similar, between which layers the float bodies (6) are inserted, the two layers of material being laid together against each other between the ends of the float bodies in order to form hinges in the wall between the float bodies.

8. Floating fence according to claim 2, characterized by said openings (9) in the wall being made in the portions (5a) of the same located between the float bodies.

* * * * *